Dec. 31, 1940.  J. L. MONTALVO-GUENARD  2,226,941

EYEGLASSES

Filed June 27, 1939

INVENTOR
José Leandro Montalvo-Guenard
BY
ATTORNEYS

Patented Dec. 31, 1940

2,226,941

UNITED STATES PATENT OFFICE 2,226,941

EYEGLASSES

José Leandro Montalvo-Guenard, Ponce, Puerto Rico

Application June 27, 1939, Serial No. 281,359

8 Claims. (Cl. 88—41)

This invention relates to spectacles provided with supplementary magnifying means and is concerned more particularly with a novel spectacle construction which includes, as a permanent or removable part, a structure or attachment by which a magnifying effect may be obtained. The spectacles of the invention are simple in construction and the attachment, which includes magnifying lenses, is light in weight and is provided with means by which those lenses may be placed and held in the different positions of adjustment that may be required for best results. The spectacles equipped with the new attachment may thus be worn with comfort and they provide a convenient magnifying means, the use of which does not interfere in any way with the freedom of movement or action of the wearer.

The new spectacles comprise the usual frame holding main lenses and including a bridge and temples, and the attachment is permanently or removably secured to a part of the frame end, preferably, to the bridge thereof. The attachment includes a support and a pair of holders, each carrying a supplementary magnifying lens, and the support is preferably extensible so that the supplementary lenses may be properly positioned lengthwise of the line of sight. The holders are also adjustably connected to the support, so that they may be moved to and from each other and thus given the correct lateral positions, and they are provided with means by which they may be detachably connected to the frame, preferably at the lower edges of the main lenses.

For a better understanding of the invention, reference may be made to the accompanying drawing in which.

Figure 1:
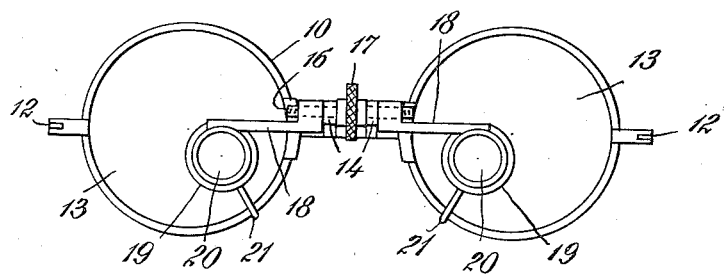
Fig. 1 is a view in front elevation of a form of the spectacles of the invention.
Figure 2:
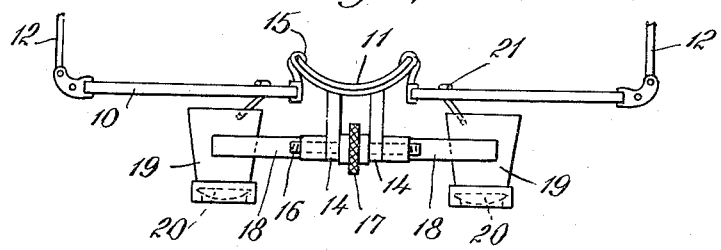
Fig. 2 is a plan view of the spectacles shown in Fig. 1 with certain parts broken away.

Referring to the drawing, the spectacles illustrated comprise a frame 10 of usual construction including a bridge 11 and temples 12 pivoted to the remainder of the frame. The frame carries the usual main lenses 13 which may be ground for correcting purposes, if desired. Secured to the frame is a support comprising members 14 which have curved ends 15 hooked over the bridge at the forward curves thereof. The members 14 have openings through which extends an adjustment screw 16 reversely threaded at its opposite ends. A knurled wheel 17 is fast on the screw at its mid-point and lies between the ends of the members 14. Threaded on opposite ends of the screw are rods 18 which lie in axial alignment and can be moved toward and away from each other by rotation of the wheel 17.

Attached to the outer ends of the rods 18 are holders 19 for supplementary lenses 20. These holders, as illustrated, are hollow and of frusto-conical shape with the large ends thereof facing the main lenses 13. The supplementary lenses are so formed that, in cooperation with the main lenses, they provide a magnifying effect. The holders are provided with rods 21 attached to their lower surfaces and formed with offset recesses in which may be received the portions of the frame extending along the lower edges of lenses 13. The engagement of rods 21 with the frames maintains the holders 19 in proper position relative to the frame and the rods are so shaped that they do not interfere with the adjustment of the holders toward and away from each other by means of screw 16 and wheel 17.

Figure 3:
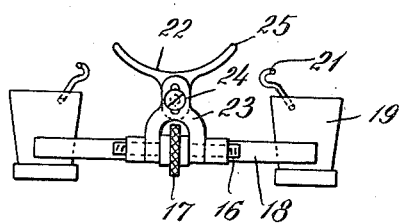
Figs. 3 and 4 are plan views of modified forms of the attachment.

The attachment illustrated in Fig. 3 includes a support made up of members 22, 23. These members have overlying, slotted ends secured together by a screw 24 passing through the slots and may be adjusted to vary the overall length of the support, as desired. The member 23 carries the adjustment screw 16 and wheel 17, previously described, and mounted on the screw are rods 18 attached to holders 19. The member 22 may be attached to the spectacle frame permanently as by having its ends 25 soldered or otherwise secured to the bridge 11, or the ends may be curved to permit their being hooked over the bridge, as in the construction illustrated in Fig. 1. The holders 19 of the Fig. 3 construction are provided with the hooks 21 similar to those previously described.

Figure 4:
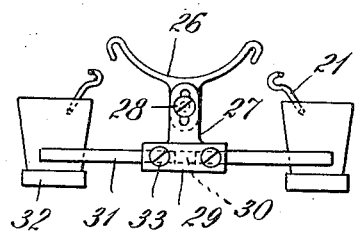

The attachment illustrated in Fig. 4 includes a support formed of a pair of members 26, 27 having overlapping slotted ends connected by a screw 28. The member 27 carries a block 29 at its outer end having axial aligned openings extending inward from its lateral faces or, if preferred, a passage 30 may be made in the block from end to end thereof. Projecting into the openings are rods 31 carrying holders 32 similar to holders 19 and the rods are secured in proper relative positions in the block by set screws 33 mounted in the block and engaging the portions of the rod lying within the openings therein. The holders 32 are provided with appropriate supplementary lenses and have hooks 21 attached thereto. The rods 31 are preferably of non-circular cross-section, as are, also, the openings in block 29.

When the attachment is a permanent part of the spectacles, the holders 19 may be swung away from the lenses 13 about the screw 16 as an axis, to permit lenses 13 and 20 to be cleaned. For this purpose, the hooked rods 21, which are of relatively flexible material, may be sprung clear of the lower edges of the frames and the holders swung, as described. The holders may be adjusted toward and away from each other by the adjustment means provided and, in those forms of attachment which include a two-part support, the holders may also be adjusted toward and away from the main lenses. In all forms of the invention, the magnifying attachment, when in position and properly adjusted, requires no attention and by its use the wearer is provided with magnifying means which will in no way interfere with his freedom of action. The new spectacles may, therefore, be used to advantage by surgeons, laboratory workers, and others who require magnifying means and, at the same time, must be free to use both hands.

I claim:

1. An attachment for use with spectacles which include a pair of lenses and a bridge connecting them, which comprises a support adapted to extend forwardly of the spectacle bridge and having means at one end by which it can be detachably connected to said bridge, a pair of holders containing supplementary lenses, means connecting the holders to the support at its other end and adjustable to vary the distance between the holders transversely of the support in a plane parallel to the plane of the spectacle lenses, and means connected to the holders and engageable with the spectacle lenses near their lower edges to maintain the holders with their axes parallel to the axes of the spectacle lenses in any adjusted position of the holders.

2. An attachment for use with spectacles which include a pair of lenses and a bridge connecting them, which comprises a support adapted to extend forwardly of the spectacle bridge and having a pair of hooks at one end by which it can be detachably connected to the said bridge, a pair of holders containing supplementary lenses, means connecting the holders to the support at its other end and adjustable to vary the distance between the holders transversely of the support in a plane parallel to the plane of the spectacle lenses, and means connected to the lower portions of the holders and engageable with the spectacle lenses near their lower edges to maintain the holders with their axes parallel to the axes of the spectacle lenses in any adjusted position of the holders.

3. An attachment for use with spectacles which include a pair of lenses and a bridge connecting them, which comprises a support adapted to extend forwardly of the spectacle bridge and formed of two parts connected by adjustable means permitting variation in the overall length of the support, means at one end of the support by which it can be detachably connected to the spectacle bridge, a pair of holders containing supplementary lenses, means connecting the holders to the support at its other end and adjustable to vary the distance between the holders transversely of the support in a plane parallel to the plane of the spectacle lenses, and means connected to the holders and engageable with the spectacle lenses near their lower edges to maintain the holders with their axes parallel to the axes of the spectacle lenses in any adjusted position of the holders.

4. An attachment for use with spectacles which include a pair of lenses and a bridge connecting them, which comprises a support adapted to extend forwardly of the spectacle bridge and having means at one end by which it can be detachably connected to said bridge, a pair of holders containing supplementary lenses, means connected to the lower portions of the holders and engageable with the spectacle lenses near their lower edges to maintain the holders with their axes parallel to the axes of the spectacle lenses in any adjusted position of the holders, and means for securing the holders to the support, said means including rods and an adjusting element operable to move the rods and holders toward and away from each other transversely of the support in a plane parallel to the plane of the spectacle lenses.

5. An attachment for use with spectacles which include a pair of lenses and a bridge connecting them, which comprises a support adapted to extend forwardly of the spectacle bridge and having means at one end by which it can be detachably connected to the spectacle bridge, a block attached to the support and having axially aligned lateral openings, rods extending into the openings, a pair of holders connected to the respective rods, each holder containing a supplementary lens, means on the block for holding the rods in adjusted relative positions transversely of the support in a plane parallel to the plane of the spectacle lenses, and means connected to the holders and lying offset from the supplementary lenses, said means being detachably connected to the spectacle lenses near their lower edges to maintain the holders with their axes parallel to the axes of the spectacle lenses in any adjusted position of the holders.

6. An attachment for use with spectacles which include a pair of lenses and a bridge connecting them, which comprises a support having means at one end by which it can be detachably connected to the spectacle bridge, a threaded rod mounted at the other end of said support and extending substantially parallel to the plane of the lenses, a holder containing a supplemental lens screwed onto each end of said threaded rod, means connected to said holders and engageable with the spectacle lenses to maintain the holders with their axes parallel to the axes of the spectacle lenses, and means to rotate said threaded rod to adjust the holders therealong and vary the distance between them.

7. An attachment for use with spectacles which include a pair of lenses and a bridge connecting them, which comprises a support having means at one end by which it can be detachably connected to the spectacle bridge, a rod mounted at the other end of said support and extending substantially parallel to the plane of the lenses, a holder containing a supplemental lens mounted on each end of said rod and movable about said rod in a plane substantially normal to the axis of the rod, said holders also being movable longitudinally along said rod to vary the distance between them, and means connected to said holders and engageable with the spectacle lenses to maintain the holders with their axes parallel to the axes of the spectacle lenses.

8. An attachment for use with spectacles which include a pair of lenses and a bridge connecting them, which comprises a support formed of two parts connected by adjustable means permitting variation in the overall length of the support, means at one end of said support by which it can be detachably connected to the spectacle bridge, a rod mounted at the other end of said support and extending substantially parallel to the plane of the lenses, a holder containing a supplemental lens mounted on each end of said rod and movable about said rod in a plane substantially normal to the axis of the rod, said holders also being movable longitudinally along said rod to vary the distance between them, and means connected to said holders and engageable with the spectacle lenses to maintain the holders with their axes parallel to the axes of the spectacle lenses.

JOSÉ LEANDRO MONTALVO-GUENARD.